United States Patent [19]

Dillard et al.

[11] Patent Number: 4,621,957
[45] Date of Patent: Nov. 11, 1986

[54] INVERTED CUTTER

[75] Inventors: Lathe T. Dillard, Redondo; Dale C. Macho, Auburn, both of Wash.

[73] Assignee: The Boeing Company, Seattle, Wash.

[21] Appl. No.: 534,041

[22] Filed: Sep. 20, 1983

[51] Int. Cl.[4] ............................................. B23B 51/00
[52] U.S. Cl. ....................................... 408/93; 408/188; 408/713
[58] Field of Search ............... 408/81, 82, 93, 188, 408/201, 225, 713, 232, 233, 238; 407/104

[56] References Cited

U.S. PATENT DOCUMENTS

| | | |
|---|---|---|
| 3,046,845 | 7/1962 | Cogsdill .......................... 408/81 X |
| 3,195,376 | 7/1965 | Bader ............................. 408/713 X |
| 3,295,187 | 1/1967 | Plummer . |
| 3,299,489 | 1/1967 | Pohle ............................. 407/104 |
| 3,299,752 | 1/1967 | Cashman . |
| 3,400,616 | 9/1968 | Mihic . |
| 3,945,753 | 3/1976 | Byers et al. ..................... 408/201 |
| 3,957,388 | 5/1976 | Jorgensen ....................... 408/240 |
| 3,963,365 | 6/1976 | Shallenberger, Jr. ............ 408/186 |
| 3,999,452 | 12/1976 | Larsen ........................... 408/188 X |
| 4,124,328 | 11/1978 | Hopkins ......................... 408/223 |
| 4,133,399 | 1/1979 | Herrmann ...................... 408/713 X |
| 4,194,862 | 3/1980 | Zweekly ......................... 408/224 |
| 4,197,042 | 4/1980 | Krhounek et al. .............. 408/200 |
| 4,210,406 | 7/1980 | Berry, Jr. ....................... 408/223 |
| 4,218,162 | 8/1980 | Hillier ............................ 408/188 |
| 4,220,429 | 9/1980 | Powers et al. .................. 408/224 |
| 4,268,198 | 5/1981 | Peters ............................. 408/186 |
| 4,281,947 | 8/1981 | Marlowe ........................ 408/82 X |
| 4,293,252 | 10/1981 | Kress et al. ..................... 408/224 |
| 4,318,647 | 3/1982 | Erkfritz ......................... 408/153 |
| 4,340,327 | 7/1982 | Martins ......................... 408/713 X |
| 4,355,932 | 10/1982 | Koppelmann et al. .......... 408/188 |

OTHER PUBLICATIONS

Catalog "Metcut End Cutting Tools" by Metal Cutting Tools, Inc., Rockford, Ill.

Primary Examiner—Z. R. Bilinsky
Attorney, Agent, or Firm—William C. Anderson

[57] ABSTRACT

An inverted cutter or a backspotfacer 100 having indexible, lockable, rotatable carbide cutter inserts 120 whereby in use an operator can reposition the inserts 120, as necessary, to assure a sharp cutting edge 175.

2 Claims, 10 Drawing Figures

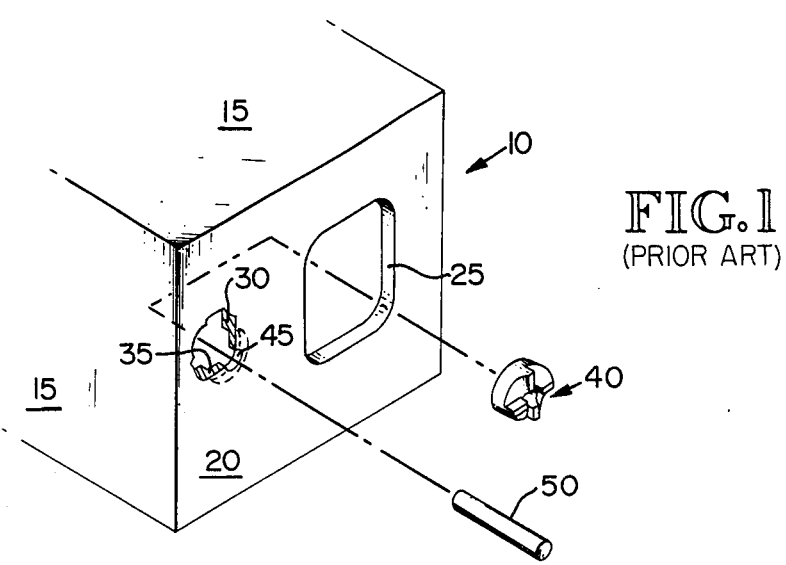
FIG. 1 (PRIOR ART)
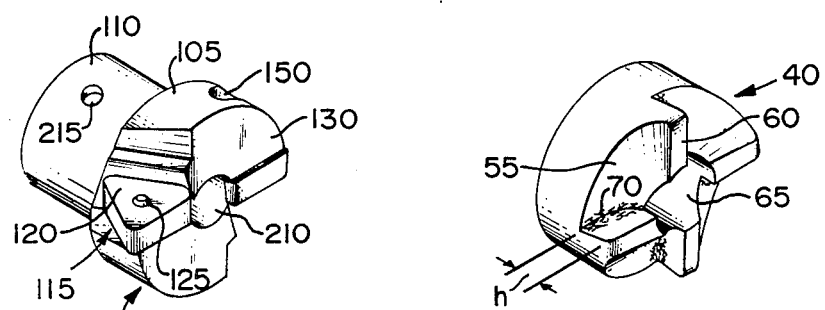
FIG. 2 (PRIOR ART)
FIG. 3
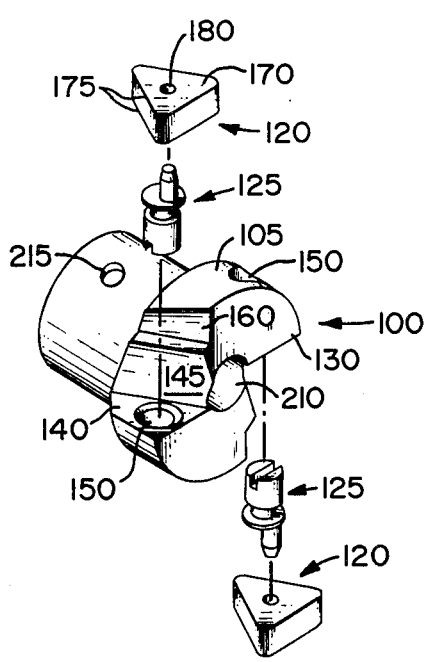
FIG. 4

INVERTED CUTTER

The Government has rights in this invention pursuant to Contract Number N00019-80-C-3000 awarded by the U.S. Navy.

TECHNICAL FIELD

The present invention relates generally to cutting tools and more particularly to a tool useful for machining a surface of a work piece disposed within a relatively inaccessible enclosure.

BACKGROUND OF THE INVENTION

Backspotfacing is a machining operation within inaccessible areas or locations. For example, assume that the back side or blind side of an obverse surface needs to be machined, e.g., the blind side has a surface to be machined to provide a cylindrical recess for receiving a washer-like seal. Assume further that the blind side or work surface is disposed within a limited working environment or an enclosure and that the only access to the work surface is through a constricted opening in the enclosure.

As will be clear to those skilled in the art, conventional boring devices such as drilling bits, countersinking tools or the like, are inappropriate for backspotfacing. For example, the seals contemplated herein have a flat bottom surface necessitating a machined flat mating surface which cannot be obtained by using a conventional drilling bit or countersinking tool. More importantly, as will be obvious to the skilled artisan, it is impossible to drive conventional drilling bits and countersinking tools when the power source is on the same side as the obverse surface and the bit or countersinking tool is positioned on the blind side.

To solve the problems of backspotfacing, inverted cutters or backspotfacers have been devised which have cutting flutes reversed as compared to conventional drilling bits and counter-sinking tools. In a typical backspotfacing operation using a conventional inverted cutter, an operator is positioned on the same side as the obverse surface. A pilot rod, attached at one end to a conventional source of rotational power, is passed through a pilot hole drilled in the center of the work surface to be finished. The inverted cutter is releasably attached to the other end of the pilot rod with its cutting surface positioned on the work surface to be machined. During the machining operation, the inverted cutter is drawn towards the operator, i.e., into the work surface, thereby forming the cylindrical recess desired.

Unfortunately, when machining abrasive materials, such as, e.g., aluminum, composite materials, etc., conventional inverted cutters wear out quickly necessitating either the replacement or the resharpening of the cutter. The replacement or resharpening of the cutter is time consuming and costly. Furthermore, each time the inverted cutter is changed or resharpened, an operator must set up properly in order to ensure that the desired cylindrical recess is obtained. Finally, the range of the depth of cut of conventional inverted cutters is limited resulting in a problem with chip clearance, i.e., too deep a cut makes it difficult for the chips, resulting from machining, to flow away from the work surface—a necessary phenomema ensuring that the machining process can continue efficiently.

Comparable problems have been experienced using conventional drilling bits and countersinking tools. To increase the useful life of these cutters, disposable cutting inserts have been used. The inserts have eliminated the relatively expensive grinding operations necessitated by a wearing down of the original cutter. Examples of cutting tools having disposable flat chip-like cutting inserts include U.S. Pat. Nos. 4,355,932; 4,318,647; 4,293,252; 4,268,198; 4,224,029; 4,218,162; 4,210,406; 4,197,042; 4,194,862; 4,133,399; 4,124,328; 3,999,452; 3,963,365; 3,957,388; 3,400,616; 3,299,752 and 3,295,187. Unfortunately, these conventional cutters are inappropriate for backspotfacing, as explained above.

To date efforts at increasing the useful life of conventional inverted cutters have been limited to brazing carbide cutting edges to a cutter and to constructing expensive cutters made of special alloys. Conventional steels are generally inappropriate because of their useful life and inability to maintain a sharp edge. While the special alloy cutters stay sharp for much longer periods of time, the cost of purchase, frequency of replacement and resharpening are undesirably high. Whether the special alloy inverted cutters are resharpened or replaced, additional set up time is still required.

SUMMARY OF THE INVENTION

With the foregoing in mind, it is the principal object of the present invention to provide an inverted cutter for performing a machining operation on a body having a relatively inaccessible work surface. The cutter of the present invention comprises a cylindrical head having a lower surface and a planar upper surface. The head is capable of rotational movement in a counterclockwise direction about its longitudinal axis (observer facing the work surface) when the planar surface is proximate the work surface during the machining operation. At least one cutting insert is provided for machining the work surface when the head is being rotated in the counterclockwise direction whereby chips are produced. The cutting insert has selectable mounting faces and a plurality of selectable cutting edges.

During use, one of the mounting faces and one of the cutting edges is selected for the machining operation. At least one left-handed flute extends from the planar surface of the cylindrical head to at least the lower surface of the cylindrical head for conducting the chips away from the work surface during the machining operation. Each flute comprises a first securing surface and a second securing surface for mounting the cutting insert. The first securing surface is offset with respect to the axis and is disposed at an angle which is skew to the axis of the cutting head to cause the selected cutting edge to be projected above the planar surface. The second securing surface intersects the first securing surface at an acute angle. An appropriate means for releasably affixing the selected mounting face upon the first securing surface and for urging the insert towards the second securing surface is also provided.

A cylindrical shank extends from the lower surface of the head and has a releasable means disposed at a position distal from the lower surface. The releasable means is capable of being coupled to a conventional rotational drive source. Finally, a bore, coaxial with the longitudinal axis of the cylindrical head, passes through the head and the shank to enable the shank releasable means to be coupled to the drive source whereby, in use, the shank may be driven in a counterclockwise direction.

BRIEF DESCRIPTION OF THE DRAWINGS

FIG. 1 illustrates the use of a conventional inverted cutter.

FIG. 2 shows the inverted cutter of FIG. 1.

FIG. 3 is a schematic of the preferred embodiment of the inverted cutter of the present invention.

FIG. 4 is an exploded view of the preferred embodiment of the present invention.

DETAILED DESCRIPTION OF THE PREFERRED EMBODIMENT

Figure 5:
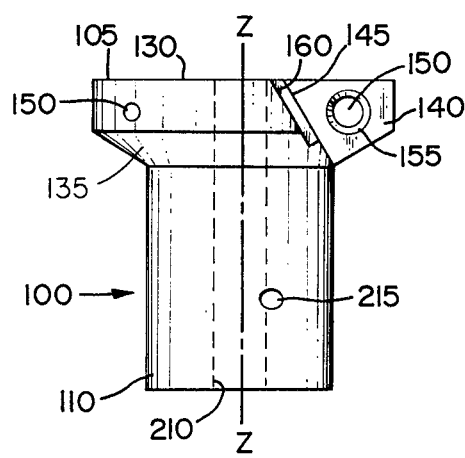
FIG. 5 is a side view of the inverted cutter of the present invention.

The machining operation known in the trade as back-spot-facing is schematically illustrated in FIG. 1. An enclosure 10 comprises a substantially closed envelope having sides 15 and an obverse surface 20. The surface 20 is provided with a somewhat constricted opening 25 allowing extremely limited access to the back side or blind side surface 30 of the obverse surface 20. In the present case it is desired to provide the blind side surface 30 with a cylindrical recess 35 having a flat bottom and adapted to receive a conventional washer-like seal (not shown) having a complimentary flat seating surface. To enable a conventional inverted cutter or a backspotfacer 40 to cut the cylindrical recess 35, a pilot hole 45 is drilled in the middle of the work surface 40 where the cylindrical recess 35 is to be machined.

As part of the set-up for the backspotfacing operation, a machinist stands on the same side as the obverse surface 20 and reaches through the access opening 25 to releasably attach (in a conventional manner) the backspotfacer 40 to an end of a conventional inverted pilot rod 50 that is passed through the pilot hole 45. A conventional source of rotational power (not shown) is releasably coupled to the other end of the pilot rod 50 and the machining operation initiated. If the machinist was able to look at the backspotfacer 40 from within the enclosure 10, he would observe that the backspotfacer 40 is rotated in a counterclockwise direction as the cutting of the cylindrical recess 35 progressed.

An enlarged view of the conventional inverted cutter or backspotfacer 40 is given in FIG. 2. The inverted cutter 40 of FIG. 2 may be made of steel alloys capable of high speed operation and comprises four left-handed flutes 55. The term left-handed flute is used herein to denote the flute of a backspotfacer as compared to the flute of a conventional drilling bit or countersinking tool. Consequently, as used herein, the flute of a conventional drilling bit, countersinking tool or other conventional cutting tool would be right-handed. The cutter 40 also comprises a plurality of cutting edges or surfaces 60 and a pilot rod attachment passage 65.

In use, the cutter 40 is typically rotated in a counterclockwise direction (with an observer within the enclosure 10 facing the surface 30) and drawn towards the blind side surface 30. Concomitantly, chips 70 formed by the machining operation will be forced along the flutes 55. As long as the depth of cut is not too great the chips will flow away from the surface being machined and the cutter 40 will not overheat or clog. However, if the depth of cut exceeds the chip clearance of the flutes 55 (as defined by the height of the flute h, see FIG. 2), chips will tend to accumulate within the flutes 55, as shown, resulting in clogging, increased operation temperatures and perhaps the necessity for external cooling.

After prolonged use the cutting surfaces 60 tend to become worn necessitating either a replacement of the cutter 40 or a resharpening of the surfaces 60. As is clear, this is time consuming and costly and often times dictates that a machinist must again set up the machining operation so that an acceptable recess 35 may be obtained. Even if a carbide cutting insert is brazed onto the cutting surfaces 60 the results are unsatisfactory because of the cost of brazing the carbide insert to the surfaces 60, the resharpening of the brazed cutting surfaces and the still relatively short useful life of the cutter.

The present invention obviates or overcomes the above described problems through the provision of an inverted cutter 100. As shown in FIGS. 3 and 4, the cutter 100 comprises a cylindrical cutting head 105 and a shank 110 made of ordinary tool steel, a plurality of left-handed flutes 115, indexible cutting inserts 120 and conventional cam pins 125.

Figure 6:
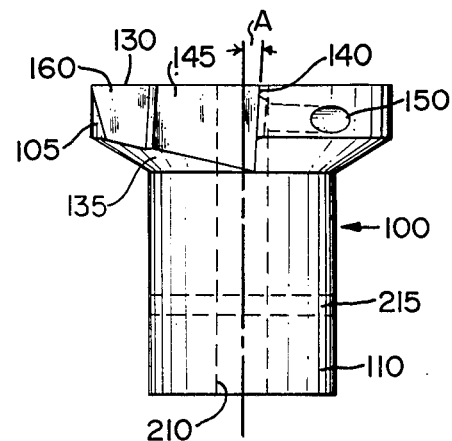
FIG. 6 is another side view of the present invention rotated 90° with respect to the view of FIG. 5.

The cylindrical cutting head 105 comprises a planar upper surface 130 and a truncated lower surface 135 (see FIGS. 5 and 6). The upper surface 130 is planar to ensure that the recess 35 is provided with a flat controlled machined surface enabling it to properly mate with a washer-like seal (not shown).

Figure 7:
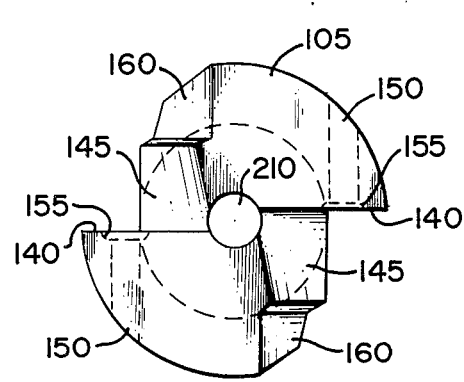
FIG. 7 is a top view of the inverted cutter of the present invention.
Figure 9:
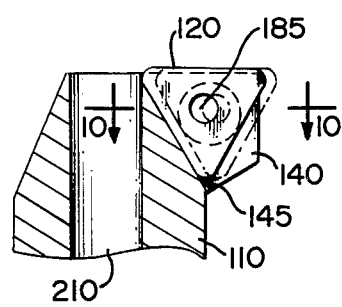
FIG. 9 is an isolated cross-sectional view illustrating the relationship between a conventional cutting insert and the head of the inverted cutter of the present invention.

The flutes 115 are formed within the head 105 and extend from the upper surface 130 to at least the lower surface 135 whereby the cutter 100 has a greater chip clearance than conventional inverted cutters and thus an increased depth of cut range. The flutes 115 each comprise a flat mounting surface 140 and a flat wedge surface 145 for securing the cutting insert 120 to the cutting head 105. As can be seen from FIG. 7, the mounting surface face 140 is offset with respect to the longitudinal axis Z—Z passing through the inverted cutter 100. The surface 140 is offset to preclude dragging of the insert 120. If sufficient radial clearance is not provided for the back edge or mounted surface of an insert 120, dragging of the back edge will occur and a clean machined surface will not be obtained. Further, the mounting surface 140 is skew with respect to the axis Z—Z, i.e., the mounting surface 140 is disposed at an angle A (see FIG. 6) known in the trade as the rake or cutting angle. In the present case, the rake angle is negative and on the order of about 3°. As a result of the disposition of the mounting surface 140, a cutting edge of the insert 120 will be projected slightly above the planar surface 130 and efficient cutting of the work surface can be effected (see FIG. 9). The mounting surface 140 has a hole 150 that extends from the surface 140 through the cylindrical head 105 and opening at the outer periphery of the head 105 (as seen in FIG. 7). Formed in the mounting surface 140 is a recess 155 coaxial with and surrounding the hole 150. The hole 150 and the recess 155 are adapted to receive the cam pin 125, as will be explained hereinafter. The wedge surface 145 is also offset with respect to the axis Z—Z of the cutter 100. The plane defined by the surface 145 intersects the plane defined by the surface 140 at an acute angle B, which is on the order of 80°, for a reason which will also be clear hereinafter. Finally, each flute 115 also comprises a tertiary or a relief surface 160 to provide increased chip clearance for the cutter 100.

Both the indexible insert 120 and the cam pin 125 are conventional and available in the open market place. For example, a comparable cam pin is disclosed and used in U.S. Pat. No. 4,197,042.

As can be seen most readily in FIGS. 3 and 4, the insert 120 is triangular in cross section and comprises two mounting faces 170 whose outer edges define selectable cutting edges 175. In use, the insert is mounted upon one of its mounting faces 170 with one of its cutting edges 175 positioned for use. Each of the mounting faces 170 is flat and adapted to mate with the mounting surface 140. Disposed within the center of each of the mounting faces 170 and extending through the insert 120 is a bore 180 adapted to cooperate with a stud 185 integral with the cam pin 125.

Figure 8:
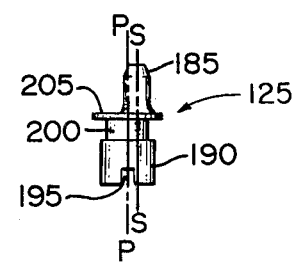
FIG. 8 is a conventional cam pin useful with the present invention.

As seen from FIGS. 4 and 8, the cam pin 125 also comprises, in addition to the stud 185, a cylindrical body portion 190 having a recess 195 for receiving a tool adapted to rotate the pin 125 about its central longitudinal axis P—P. Integral with the cylindrical body portion 190 is an intermediate section 200, a flange 205 and the stud 185 having an axis S—S which is eccentric with respect to the central axis P—P of the cam pin 125. The axis of the flange 205 is coaxial with the axis P—P and is adapted to cooperate with the recess 155 as will be understood shortly.

Figure 10:
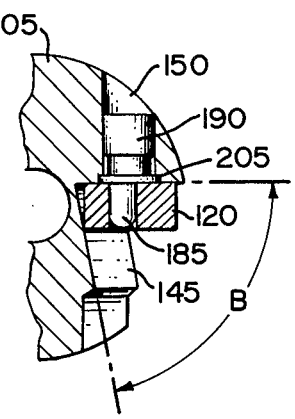
FIG. 10 is a cross-sectional view taking along line 10—10 in FIG. 9.

To mount an insert 120 upon the surface 140, the cam pin 125 is inserted into the hole 150 with the flange 205 seated within the recess 155. When the pin 125 is placed within the hole 150 the stud 185 extends perpendicularly from the surface 140 (as shown in FIG. 10). Using an appropriate tool, such as a screwdriver driver (not shown), the pin 125 is first rotated so that the stud 185 is positioned as far as possible from the wedge surface 145, as seen in phantom in FIG. 9. As can be readily understood, rotation of the pin 125 about its axis P—P causes the stud 185 to move eccentrically rather than rotate about its axis S—S. Consequently, it is quite easy to position the stud 185 at a greater or lesser distance from the wedge surface 145. A mounting face 170 and a cutting edge 175 is selected and the stud 185 is inserted within the bore 180. The unlocked or unsecured position of the insert 120 is also shown in phantom in FIG. 9.

To secure or lock the insert 120, the tool is rotated in a counterclockwise sense (as viewed in FIG. 9), thereby rotating the pin 125 about its axis P—P. Concomitantly, the stud 185 is caused to move eccentrically relative to the axis P—P and towards the wedge surface 145. The outside surface of the stud 185 engages the inside surface of the bore 180 whereby the insert 120 is urged into a locked or a secured position represented by the solid lines in FIG. 9, wherein the wedge surface 145 engages the insert 120 (see FIG. 10).

In order to either change an insert 120 or to select or index another cutting edge 175, the insert 120 is readily disengaged from its secured position on the mounting surface 140 by rotating the pin 125 in a clockwise sense. The insert 120 thus moves from the solid line position shown in FIG. 9 to the unlocked position shown in phantom. Again, this occurs as a result of the engagement between the outer surface of the stud 185 and the inner surface of the bore 180.

The flange 205 prevents the cam pin 125 from falling through the hole 150. Since the tool recess 195 is located at the cylindrical body portion 190, rotation of the pin 125 tends to push the pin 125 out of the hole 150. While there is a tendency for the tool to push the pin 125 out of the hole 150 during the locking operation, the insert needs to be only initially held in position to prevent this from occurring. Furthermore, the wedge surface 145 aids in preventing the pin from being pushed out of the hole 150.

The shank 110 comprises a cylindrical body portion. It is integral with and extends from the lower surface 135. The shank 110 is provided with a bore 210 which is coaxial with the longitudinal axis Z—Z of the cutter 100. The bore 210 also extends through the cutting head 105 to enable a conventional inverted pilot rod to be inserted within the head 105 and be releasably coupled, as to a bar 215, disposed at a distal portion of the shank 110.

The advantages of the present cutter 100 over conventional inverted cutters become evident with prolonged use. For example, when a cutting edge 175 of an insert 120 becomes worn, replacement of an insert or the indexing of another edge 175 may be readily effected. Further, the cutter 100 has greater chip clearance than conventional inverted cutters because each flute 115 extends at least between the planar surface 130 and the lower surface 135. Additional chip clearance is, of course, provided by the provision of the relief 160. While the present cutter has been illustrated as having two left-handed flutes, it is obvious that the cutter may be provided with three or more flutes.

Many changes and modifications in the above described embodiment of the invention can of course be carried out without departing from the scope thereof. Accordingly, that scope is intended to be limited only by the appended claims.

What is desired to be claimed and secured by Letters Patent of the United States is:

1. An inverted cutter for performing a machining operation on a body having a relatively inaccessible work surface, comprising:

a cylindrical head having a lower surface and a planar upper surface, said head being capable of rotational movement in a counterclockwise direction about its longitudinal axis when said planar surface is proximate said work surface during said machining operation;

means for cutting said work surface when said head is being rotated in a counterclockwise direction whereby chips are produced, said cutting means comprising at least one cutting insert having selectable mounting faces, said insert being provided with a plurality of selectable cutting edges, one of said mounting faces and one of said edges being selected for use during said machining operation;

means forming at least one left-handed flute extending from said planar surface to at least said lower surface for conducting said chips away from said work surface during said machining operation, said flute means comprising a first securing surface and a second securing surface for mounting said cutting insert, said first securing surface being offset with respect to said axis and being disposed at an angle which is skew to said axis to cause said selected cutting edge to be projected above said planar surface, said second securing surface intersecting said first securing surface at an acute angle;

means for releasably affixing said selected mounting face upon said first securing surface and for urging said insert towards said second securing surface;

a shank extending from said lower surface of said head, said shank having releasable means disposed at a position distal from said lower surface and capable of being coupled to a rotational drive source; and a bore, coaxial with said axis, passing through said head and said shank to enable said shank releasable means to be coupled to said drive source whereby said shank may be driven in a counterclockwise direction during said machining operation.

2. The inverted cutter of claim 1, wherein said flute means comprises a tertiary surface offset from said second securing surface to provide increased chip clearance for said cutter.

* * * * *